(No Model.)
J. A. MOSHER.
ELECTRIC ARC LAMP.
No. 538,457. Patented Apr. 30, 1895.
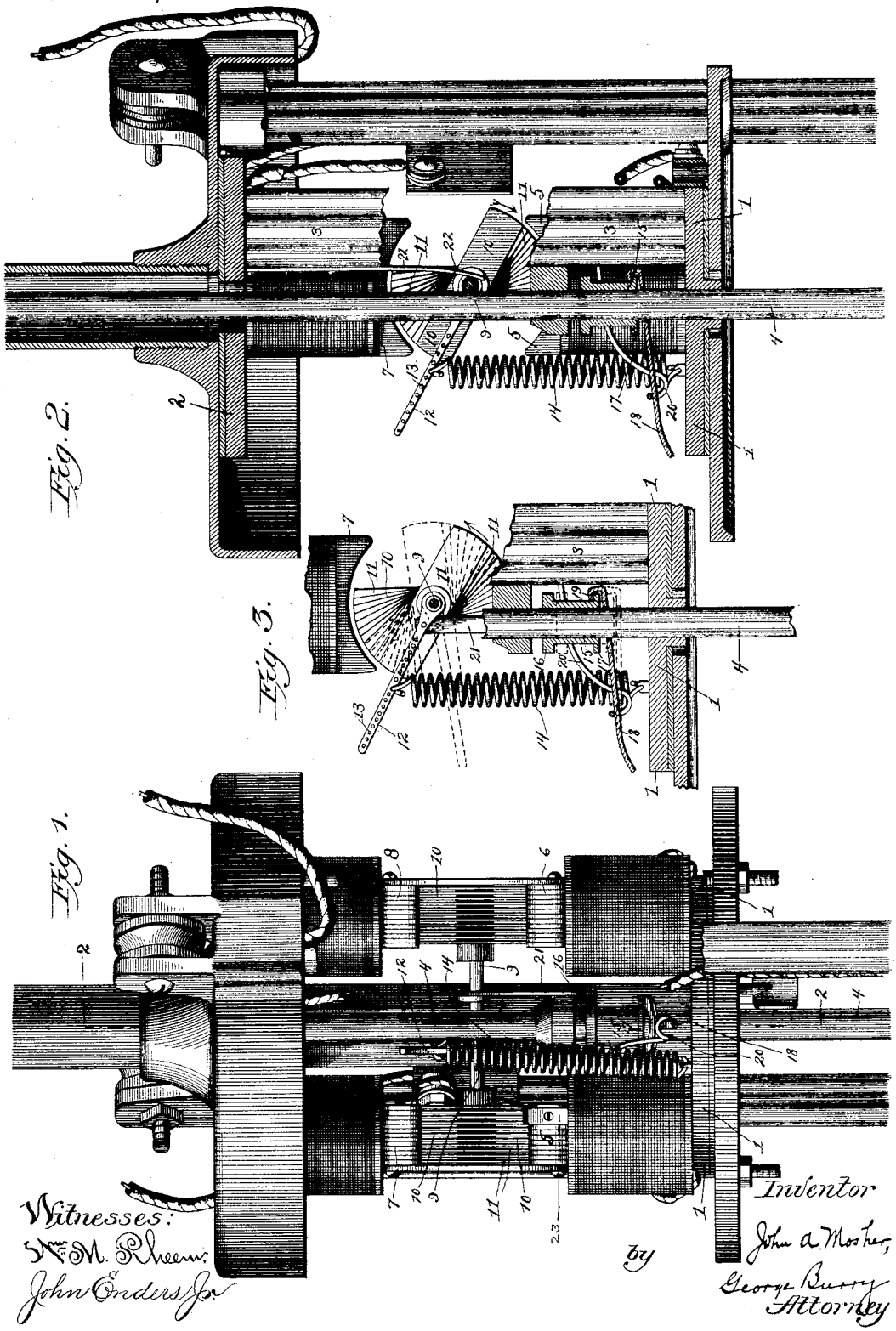

UNITED STATES PATENT OFFICE.

JOHN A. MOSHER, OF CHICAGO, ILLINOIS.

ELECTRIC-ARC LAMP.

SPECIFICATION forming part of Letters Patent No. 538,457, dated April 30, 1895.

Application filed February 9, 1893. Serial No. 461,677. (No model.)

*To all whom it may concern:*

Be it known that I, JOHN A. MOSHER, a citizen of the United States, residing at Chicago, in the county of Cook and State of Illinois, have invented certain new and useful Improvements in Electric-Arc Lamps, of which the following is a specification, reference being had to the accompanying drawings, in which—

Figure 1 is a side elevation. Fig. 2 is a vertical section on the line 2 2 of Fig. 1; and Fig. 3 is a detail, being a view of the armature and adjacent parts.

My invention relates to electric arc lamps, and particularly to such lamps adapted to be used with an alternating current.

The object of my invention is to provide a new and improved arc lamp which will be particularly adapted for use with an alternating current. I accomplish this object as illustrated in the drawings and as hereinafter specified.

That which I regard as new will be set forth in the claims.

In the drawings, 1 and 2 indicate lower and upper plates, preferably circular in form, which are adapted to support the different parts of the feed mechanism. The plates 1 and 2 are connected by a plate 3, or by other suitable connecting devices, and preferably the plates 1, 2 and 3 are in one piece.

4 indicates a carbon rod, of the usual construction, which passes through the plates 1 and 2, and is adapted to carry the upper carbon.

5 and 6 indicate the poles of an electro magnet which is supported by the base plate 1 in such manner that the poles lie on opposite sides of the rod 4. Each of the poles 5 and 6 is laminated, being composed of thin plates of soft iron, which plates are surrounded by a helix in the usual manner. The wires which compose the helices are of suitable size to conduct the proper amount of current without causing too great heat.

7 and 8 indicate the poles of a second electro magnet, which poles are similarly mounted on opposite sides of the rod 4, and are over and opposite the poles 5 and 6, as shown in Fig. 1. The surfaces of the poles 5, 6, 7 and 8 are concave, as shown in Figs. 2 and 3, opposite poles being arcs of the same circle.

The two electro magnets are connected together preferably in multiple arc and in series to the arc proper.

9 indicates a shaft which is mounted in suitable bearings, and extends centrally between the opposite poles of the magnets, as shown in Figs. 2 and 3.

Rigidly mounted upon the shaft 9 between the poles of the opposite magnets are armatures 10, as shown. Each armature 10 is made up of a number of flat plates 11, which are rigidly mounted upon the shaft 9 and separated from each other by washers, or by any other suitable means, and which plates are arranged to overlap each other successively, so that the armature assumes somewhat the shape of an open fan. The ends of each of the plates 11 are curved in the arc of a circle concentric with the inner surfaces of the magnet poles, and the length of the plates 11 is such that the armatures may be revolved between the poles of the magnets.

With this construction, by rotating the shaft 9 the armatures may be so rotated as to bring any desired number of the armature plates 11 within the influence of the electro magnets.

The armature 10 is very similar to the form shown and described in my application of even date herewith, Serial No. 461,678, for improvements in electric motors and armatures for same.

12 indicates a lever, one end of which is rigidly secured to the armature shaft, as shown in Fig. 3. The lever 12 is provided with a number of holes 13, as shown in Fig. 3.

14 indicates a coil spring the upper end of which is connected to the lever 12 through one of the holes 13. The lower end of the spring 14 is connected to the base plate 1. The tension of the spring is such as to exert downward pressure on the lever 12, thereby tending to rotate the armatures in the direction indicated by the arrow in Fig. 3, and thereby moving them out of the influence of the magnets.

15 indicates a sleeve, which is mounted upon the carbon rod 4, and is adapted to slide freely thereon. The sleeve 15 is provided with flanges 16 and 17 at its upper and lower ends respectively, as shown in Fig. 3.

18 indicates a lever, which at one end is connected with the lower portion of the sleeve 15, preferably by means of a hook 19, which fits over the flange 17, as shown in Fig. 3. The outer end of the lever 18 is adapted to engage the base plate 1 when the sleeve 15 is moved downward sufficiently. The lever 18 encircles the carbon rod 4, the hole through which the rod 4 passes being slightly larger than the rod 4, whereby when the lever 18 is in a horizontal position the rod 4 may be moved freely through said hole. When, however, the lever 18 is tilted downward the front and rear edges of the hole will engage the surface of the rod and clutch it firmly, thereby preventing downward movement of the rod.

20 indicates a spring, one end of which is connected to the plate 3, or other suitable support, the other end bearing upon the outer part of the lever 18 in such manner as to exert a downward pressure thereon, and thereby clamp the lever 18 upon the carbon rod 4, as shown in Fig. 3.

21 indicates a connecting rod or strip, one end of which is pivotally connected with the sleeve 15, the other end being pivotally connected with the lever 12 a short distance from the shaft 9.

With this construction, by rotating the shaft 9 in one direction or the other the sleeve 15 will be moved upward or downward, depending upon the direction of the rotation of the shaft, and as the lever 18 is firmly clamped upon the carbon rod 4, the carbon rod 4 will be moved with the sleeve 15. When the sleeve 15 is moved downward sufficiently to cause the outer end of the lever 18 to come in contact with the base plate 1, or other device arranged for the purpose, the outer end of the lever 18 is elevated sufficiently to release the carbon rod 4 and to permit it to feed downward sufficiently to maintain a normal arc.

22 indicates a spring strip, the upper end of which is connected with the plate 3, or other suitable support, its lower end bearing against the armature shaft 9. The spring 22 serves to steady the action of the shaft and to overcome the vibrations caused by the alternations of the current.

23 indicates a stop mounted in a suitable position to engage the armature to limit its rotation under the action of the spring 14.

The operation of my improved lamp is as follows: The carbons being in contact, the full force of the current will pass through the electro magnets, which will thereby attract the armatures 10, 10, causing them to rotate in the direction indicated by the arrow in Fig. 2. The lever 12 will thereby be moved upward raising the connecting rod 21 and the sleeve 15. The carbon rod 4 will also be raised, owing to the action of the lever 18, and the length of the arc will be automatically regulated. As the carbons are consumed, the force of the current will be diminished, owing to the increased resistance, and the force of the electro magnets will be correspondingly diminished. Owing to the reduced force of the electro magnets the spring 14 and the suspended parts will cause the lever 12 to move downward, slightly rotating the armatures in the direction indicated by the arrow in Fig. 3, and causing the carbon rod 4 to move downward slightly. This action will be repeated until the outer end of the lever 18 is elevated by contact with the base plate 1, or other suitable device, and such lever is moved toward a horizontal position. The carbon rod 4 will then be released, permitting the carbon to drop until the resistance is diminished sufficiently to cause an increased current of such intensity as to strengthen the magnets sufficiently to cause them to again attract the armatures 10, and rotate them in the direction indicated in Fig. 2 as at first. By the use of armatures composed of separate plates, a much more effective action is secured, as the magnets act separately upon each plate, and until all the plates are within the field of the magnets, the magnets will tend to rotate the armatures in the direction indicated by the arrow in Fig. 2. By this means practically a constant force is secured, and the feeding of the carbon is made steady, thereby making a steady light. By adjusting the position of the upper end of the spring 14 by means of the holes 13 in the lever 12, a greater or less leverage will be secured, and the action of the spring thereby increased or diminished.

I do not wish to limit myself to the specific means shown for adjusting the spring 14, nor to the specific devices shown for connecting the lever 18 to the sleeve 15. It is only essential that the lever 18 should be so secured to the sleeve as to permit of its outer end being moved upward or downward to throw it into a horizontal or inclined position to unclamp or clamp the rod 4.

Any suitable devices other than those shown for supporting the working parts may be used which are of such construction as not to interfere with the operation of the feed mechanism.

What I claim as my invention, and desire to secure by Letters Patent, is—

1. The combination with the poles of an electro magnet or magnets of a rotatable armature mounted between said poles, said armature consisting of a number of plates successively overlapping each other devices for supporting the lower carbon pencil, a vertically movable carbon-rod adapted to support the upper carbon pencil over the said lower pencil, devices connecting said rotating armature with said carbon-rod, whereby by the rotation of said armature said carbon-rod may be moved vertically, and devices operated by the rotation of the armature for throwing such connecting devices out of operation, substantially as described.

2. The combination with the poles of an electro magnet or magnets, a rotating armature mounted between said poles said armature consisting of a number of plates successively overlapping each other and means for rotating said armature in such manner as to move it gradually out of the influence of said poles, of a carbon-rod 4, devices connecting said carbon-rod with said armature, whereby by the rotation of the armature the carbon-rod will be moved vertically, and devices operated by the rotation of the armature for throwing said connecting devices out of operation, and thereby permitting the carbon rod to drop, substantially as described.

3. The combination with the poles of an electro magnet or magnets, a rotatable armature between said poles said armature consisting of a number of plates successively overlapping each other and devices operating to rotate said armature and to move it out of the influence of said poles, whereby as the intensity of the current is diminished the armature will be gradually rotated in such direction as to move it out of the influence of the magnets, of a vertically movable carbon rod, clutching devices connecting said armature to said carbon rod in such manner that as the armature is attracted by the electro magnets the carbon rod will be lifted, and when the armature moves in the opposite direction the carbon rod will be lowered, and devices for releasing said clutch to permit the carbon rod to drop, substantially as described.

4. The combination with the poles of an electro magnet or magnets, an armature shaft 9 mounted between said poles and an armature 10 mounted upon said shaft, said armature consisting of a number of plates 11 successively overlapping each other, of a lever 12 connected to said shaft, a spring 14 exerting a downward pressure upon said lever, a carbon rod 4, a sleeve mounted upon said carbon rod and movable vertically thereon, devices connecting said sleeve to said lever 12, clutching devices connecting said sleeve to said carbon rod, and means for automatically throwing said clutching device out of operation when the sleeve has moved downward to a certain point, substantially as described.

5. The combination with the poles of an electro magnet or magnets, an armature shaft 9 mounted between said poles, an armature 10 mounted upon said shaft consisting of a series of overlapping plates 11, and means for rotating said armature against the influence of the magnet, a vertically movable carbon rod, a sleeve mounted thereon, devices connecting said sleeve to said armature, whereby by the rotation of the armature the sleeve will be vertically moved, a lever 18 connected to said sleeve, the inner end of said lever having a hole or slot through which the carbon rod passes, the edges of the hole or slot being of such size that when the said lever 18 is moved out of a horizontal position the edges of the hole or slot will engage and clamp the surface of the carbon rod, a spring firmly holding said lever in an inclined position, and devices for moving said lever into a horizontal position when the sleeve reaches a certain point in its downward movement, substantially as described.

6. The combination with the poles of an electro magnet, a shaft 9, a rotatable armature carried thereby adapted to rotate between the poles of the magnet, said armature consisting of a series of plates 11, of a lever 12 connected with the said shaft, a spring 14 exerting a downward pressure upon said shaft 9 and adjustably connected therewith, a vertically movable carbon rod, a clamp connecting said lever to said carbon rod, whereby when said armature is rotated the carbon rod will be moved vertically, and devices for throwing said clamp out of operation when the carbon rod has been moved downward to a certain position, substantially as described.

7. The combination with the poles of an electro magnet or magnets, an armature shaft mounted between said poles, and an armature mounted upon said shaft, said armature consisting of a series of plates 11 overlapping each other, of a lever 12 connected with the said shaft, a spring exerting a downward pressure upon said lever, a carbon rod 4, a sleeve 15 mounted upon said carbon rod, a connecting rod 21 connecting said sleeve with said lever 12, a lever 18 encircling said carbon-rod, connected at one end to said sleeve 15, said lever being adapted to clamp said carbon-rod when in an inclined position, a spring 20 firmly holding said lever 18 in an inclined position, and devices adapted to engage said lever 18 to move it into a horizontal position when the sleeve 15 arrives at a certain point in its downward movement, substantially as described.

8. The combination with the poles of an electro magnet or magnets of a rotatable armature mounted between said poles said armature consisting of a number of plates successively overlapping each other devices for supporting the carbon pencils, devices connecting the armature with the pencils in such a way that the length of the arc may be regulated by the rotation of the armature, substantially as described.

9. The combination with the poles of an electro magnet or magnets of a rotatable armature mounted between said poles, said armature consisting of a number of plates successively overlapping each other devices for supporting the lower carbon pencil, a vertically movable carbon-rod adapted to support the upper carbon pencil over the lower pencil, devices connecting the rotatable armature with the carbon-rod in such a way that the length of the arc may be regulated by the rotation of the armature, substantially as described.

JOHN A. MOSHER.

Witnesses:
CHARLES H. JACKSON,
EDWIN M. McKINNEY.